(12) United States Patent
Bosco et al.

(10) Patent No.: US 12,443,768 B2
(45) Date of Patent: Oct. 14, 2025

(54) METHOD, DEVICE AND POSITIONING SYSTEM FOR POSITIONING A SENSOR

(71) Applicant: Siemens Aktiengesellschaft, Munich (DE)

(72) Inventors: Arianna Bosco, Munich (DE); Christoph Heinrich, Donauwörth (DE); Mohamed Khalil, Munich (DE); P. V. Sudev Nair, Karnataka (IN)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 713 days.

(21) Appl. No.: 17/259,589

(22) PCT Filed: Jun. 25, 2019

(86) PCT No.: PCT/EP2019/066869
§ 371 (c)(1),
(2) Date: Jan. 12, 2021

(87) PCT Pub. No.: WO2020/007663
PCT Pub. Date: Jan. 9, 2020

(65) Prior Publication Data
US 2021/0334418 A1    Oct. 28, 2021

(30) Foreign Application Priority Data
Jul. 6, 2018 (EP) .................................... 18182182

(51) Int. Cl.
*G06F 30/10* (2020.01)
*G06F 30/23* (2020.01)
(52) U.S. Cl.
CPC .............. *G06F 30/10* (2020.01); *G06F 30/23* (2020.01)

(58) Field of Classification Search
CPC ................................. G06F 30/10; G06F 30/23
See application file for complete search history.

(56) References Cited

U.S. PATENT DOCUMENTS 6,236,908 B1    5/2001  Cheng et al.
7,152,001 B2 *  12/2006 Aughton ................. E02B 13/00
                                                          702/2

(Continued)

FOREIGN PATENT DOCUMENTS

CN    102016736 A    4/2011
CN    103092072 A    5/2013

(Continued)

OTHER PUBLICATIONS

Behzad Omidali et al.; "Sensor Placement to Improve the Positioning Performance Based on Angle of Arrival (AOA)"; Wireless Engineering and Technology, 2010, 1, 41-45 (Year: 2010).*

(Continued)

*Primary Examiner* — Nithya J. Moll
*Assistant Examiner* — Nupur Debnath
(74) *Attorney, Agent, or Firm* — Schmeiser, Olsen & Watts LLP (57) ABSTRACT

Provided is a method, a device and a positioning system for positioning a sensor at an optimized position for optimized monitoring of a technical system. The method includes providing a physical simulation model of the technical system, wherein the physical simulation model includes a virtual sensor at a given position, simulating a performance of the technical system by the physical simulation model, providing a response signal of the virtual sensor to the simulated performance at the given position, determining a first optimized position for the virtual sensor where the response signal is intensified by an optimization algorithm, (Continued)

and providing co-ordinates of the first optimized position for positioning a physical sensor at the technical system.

20 Claims, 3 Drawing Sheets

(56) References Cited

U.S. PATENT DOCUMENTS

| | | | | |
|---|---|---|---|---|
| 8,274,276 | B2* | 9/2012 | Kreutzbruck | G01N 27/9006 324/242 |
| 2009/0070048 | A1* | 3/2009 | Stothers | G01N 29/14 73/587 |
| 2009/0167298 | A1* | 7/2009 | Kreutzbruck | G01N 27/9006 324/235 |
| 2011/0106510 | A1 | 5/2011 | Poon | |
| 2014/0058709 | A1* | 2/2014 | Machado Viana | G05B 23/0243 703/2 |
| 2014/0222372 | A1* | 8/2014 | Sprenger | G05B 19/404 702/155 |
| 2016/0071004 | A1* | 3/2016 | Salahshoor | G05B 23/0283 706/2 |
| 2016/0098501 | A1 | 4/2016 | Reitman et al. | |
| 2018/0228549 | A1* | 8/2018 | Steinle | B25J 9/1697 |
| 2020/0034500 | A1* | 1/2020 | Yi | G01M 5/0041 |
| 2023/0169237 | A1* | 6/2023 | Lee | E21B 43/16 703/2 |

FOREIGN PATENT DOCUMENTS

| | | |
|---|---|---|
| CN | 104008259 A | 8/2014 |
| CN | 105954493 A | 9/2016 |
| CN | 106989778 A | 7/2017 |
| WO | 2011060424 A1 | 5/2011 |

OTHER PUBLICATIONS

Vahab Akbarzadeh et al.; "Efficient Sensor Placement Optimization Using Gradient Descent and Probabilistic Coverage"; Sensors 2014, 14, 15525-15552; website: https://www.ncbi.nlm.nih.gov/pmc/articles/PMC4179027/pdf/sensors-14-15525.pdf (Year: 2014).*
Hongrui Cao et al.; "Method for Vibration Response Simulation and Sensor Placement Optimization of a Machine Tool Spindle System with a Bearing Defect"; Sensors 2012, 12, 8732-8754; doi: 10.3390/s120708732 (Year: 2012).*
Vahab Akbarzadeh et al.; "Efficient Sensor Placement Optimization Using Gradient Descent and Probabilistic Coverage"; Sensors 2014, 14, 15525-15552; doi: 10.3390/s140815525 (Year: 2014).*
S.A. Mostafavi et al.; "Optimal visual sensor placement for coverage based on target location profile"; Ad Hoc Networks 9 (2011) 528-541 (Year: 2011).*
PCT International Search Report and Written Opinion of International Searching Authority mailed Sep. 19, 2019 corresponding to PCT International Application No. PCT/EP2019/066869 filed Jun. 25, 2019.
European Search Report for Application No. 18182182.8, dated Jan. 2, 2019.

* cited by examiner

FIG 1

METHOD, DEVICE AND POSITIONING SYSTEM FOR POSITIONING A SENSOR

CROSS-REFERENCE TO RELATED APPLICATIONS

This application claims priority to PCT Application No. PCT/EP2019/066869, having a filing date of Jun. 25, 2019, which is based off of EP Application No. 18182182.8, having a filing date of Jul. 6, 2018, the entire contents both of which are hereby incorporated by reference.

FIELD OF TECHNOLOGY

The following relates to a method, a device and a positioning system for positioning a sensor to monitor a technical system, wherein the position of the sensor is optimized to provide an intensified response signal to a performance of the technical system.

BACKGROUND

For operation monitoring of a technical system, e.g., an industrial plant or a machine, accurate positions of sensors are desired to enable for example thorough health monitoring, life time prognosis or fault detection and/or identification. A misplacement of a sensor can lead to poor sensor data and hence to an inaccurate monitoring and/or prognosis.

However, an optimal sensor configuration, in particular of different types, is constrained by restricted domain or accessibility for mounting or embedding them.

SUMMARY

An aspect relates to determine an optimal position for at least one sensor to yield improved sensor data quality for precise prognosis and/or fault detection.

A first aspect of embodiments of the invention relates to a method for positioning a sensor comprising the following steps:
  providing a physical simulation model of a technical system, the physical simulation model comprising a virtual sensor at a given position,
  simulating a performance of the technical system by means of the physical simulation model,
  providing a response signal of the virtual sensor to the simulated performance at the given position,
  determining a first optimized position for the virtual sensor where the response signal is intensified by means of an optimization algorithm, and
  providing coordinates of the first optimized position for positioning a physical sensor at the technical system.

It is an advantage of embodiments of the present invention that an optimized position for a physical sensor is found using a computer-based physical simulation of a technical system and a virtual sensor, wherein an optimized position is determined based on a response signal of the virtual sensor. The virtual sensor and the physical sensor are of a similar or the same type. In particular, a suited optimization algorithm can be used to find an optimized position for a virtual sensor where its simulated response signal to the performance of the simulated technical system is optimized or intensified. The optimization can further take geometrical limitations and properties of the technical system into account as it is in particular based on the physical simulation. Determining an improved position for a sensor results in improved sensor data quality and, hence, enables an improved health monitoring and/or prognosis of a state of the technical system.

The technical system can be for example an industrial plant, a power plant, a motor, a turbine, or an engine, but is not limited to such examples. A sensor can be any type of sensor, as e.g. a camera, a temperature sensor, a voltage sensor, a vibration sensor, or a flux sensor, but is not limited to such examples. The physical simulation model of the technical system comprises physical properties of the technical system and can be used to perform a physical simulation, e.g. a dynamical simulation, of its performance. The physical simulation model can be pre-calculated or constructed in advance. The physical simulation model further comprises at least one virtual sensor, which is allocated to the technical system and which is suited to monitor the performance of the technical system and return a response signal to the performance. The physical simulation model can for example be based on a computer-aided design model, describing the geometrical properties, and a finite-element-analysis simulation, describing the physical properties.

The response signal of a virtual sensor at a given position can be virtually recorded, i.e. simulated and stored as a dataset, and fed to the optimization algorithm. The position of the virtual sensor is optimized based on its response signal. An aspect of the optimization can be enhancing the response signal of the virtual sensor. Simulating for example an engine which is monitored by a vibration sensor can result in a specific vibration response signal at a given sensor position. An optimized sensor position can be found based on where the vibration response signal is intensified.

The coordinates of the optimized position can be outputted and for example transferred to a positioning system to place a physical sensor at the according position.

According to a preferred embodiment of the method, the response signal of the virtual sensor can be compared to information about a behavior of the technical system acquired from the simulation, and depending on the comparison the first optimized position can be determined.

Using information provided by the physical simulation about physical and/or technical properties of the technical system, particular properties can be determined which can indicate a potential well-suited position for a sensor. In particular, information about a behavior of the technical system, e.g. with respect to a measured quantity by the sensor, can be used. A physical simulation can for example output the parts of a technical system where high vibration amplitudes can be expected. This information can be used to find an optimized sensor position for a vibration sensor in order to yield an optimal response signal to system vibrations.

According to a preferred embodiment of the method
  the physical sensor can be placed at a position depending on the coordinates of the first optimized position,
  a response signal of the physical sensor can be recorded,
  the response signals of the virtual sensor and the physical sensor can be compared, and
  the position, at which the physical sensor is placed, can be validated based on the comparison of the response signals.

A physical or real sensor can be placed at the physical technical system by using the provided coordinates of the first optimized position. Validation, i.e. for example evaluation or positional check, of the sensor placement can be performed based on the comparison of the according response signals.

According to a preferred embodiment of the method a notification about a result of the validation can be provided.

A notification can for example be a warning or confirmation signal, a message or displayed information depending on the validation result. It is favorable to replace a physical sensor in case of a negative validation and to repeat the comparison.

According to a preferred embodiment of the method the physical simulation model can be updated based on sensor data of the physical sensor.

The update of the physical simulation model is performed depending on the result of the validation. It is favorable to update the physical simulation model based on physical sensor data at the first optimized position to improve or refine the sensor positioning and therefore the sensor data quality.

According to a preferred embodiment of the method
- a fault of the technical system can be simulated by means of the physical simulation model,
- a response signal to the fault by the virtual sensor can be provided,
- a second optimized position of the virtual sensor, where the response signal to the fault is intensified, can be determined by means of the optimization algorithm, and
- the coordinates of the second optimized position and/or the response signal to the fault at the second optimized position can be provided.

It is favorable to simulate a fault or an error, such as a system failure, or a software or hardware error, of the technical system and provide information about the erroneous performance. In particular, the simulated response signal to the fault of a virtual sensor can be examined. It can be intensified by determining an optimized position of the sensor. Hence, one can retrieve a second optimized position for a sensor depending on a specific fault or error of the system.

According to a preferred embodiment of the method
- a response signal of a physical sensor placed at the second optimized position can be recorded,
- the response signal of the physical sensor can be compared to the response signal to the fault of the virtual sensor, and
- an error control of the technical system can be performed depending on the comparison of the response signals.

The placement of a physical sensor at a second optimized position, where an intensified response signal to a specific fault or error is expected, can enable an accurate fault detection and/or prognosis of a specific error.

According to a preferred embodiment of the method the physical simulation model can comprise a plurality of virtual sensors of at least two different sensor types and optimized positions thereof can be determined where the response signals of the virtual sensors are intensified by means of the optimization algorithm.

The simulation can be conducted for a plurality of sensors of different sensor types, such as a network of sensors. Using a suited optimization algorithm, optimized positions for the plurality of sensors can be found such that their response signals are intensified and synchronized, without for example duplicating sensor data.

According to a preferred embodiment of the method the physical simulation model comprises a design model and a mathematical or numerical or data model of the technical system.

The physical simulation model can for example be based on a computer-aided design model, describing the geometrical properties, and a finite-element-analysis simulation, describing the physical properties. The physical simulation can for example output information about the expected performance of the simulated technical system. A finite-element-analysis simulation can for example provide physical conditions of the technical systems which can used to find an optimized position for a sensor.

According to a preferred embodiment of the method the physical sensor can be placed at the first optimized position or the second optimized position by means of a positioning system.

A physical sensor is placed by for example an automated positioning system, such as an actuator of an automated system such as a robot, to the provided first or second optimized position.

Another aspect of embodiments of the invention relates to a device for positioning a sensor, comprising:
- a simulation module configured to provide a physical simulation model of a technical system, the physical simulation model comprising a virtual sensor at a given position, and to simulate a performance of the technical system by means of the physical simulation model, and to provide a response signal of the virtual sensor to the simulated performance at the given position,
- an optimization module configured to determine a first optimized position for the virtual sensor where the response signal is intensified by means of an optimization algorithm, and
- an output module configured to provide coordinates of the first optimized position for positioning a physical sensor at the technical system, wherein the virtual sensor and the physical sensor are of a similar type.

The device is in particular suited to execute a method according to embodiments of the invention. The device is coupled or allocated to the technical system and/or at least one physical sensor is suited to monitor the technical system. It is also possible that the device is implemented as a software application or remote or cloud application having a communication connection to the technical system and/or a physical sensor. The device can further be an assistance system to support a user.

According to an p embodiment the device can comprise a validation module configured to validate a position of a physical sensor, wherein a response signal of the physical sensor is recorded, the response signals of the virtual sensor and the physical sensor are compared, and the position of the physical sensor is validated based on the comparison of the response signals.

The validation module can be coupled or allocated to the technical system and/or at least to one physical sensor suited to monitor the technical system.

According to an embodiment the device can comprise a notification module configured to provide a notification about a result of the validation.

The notification module can for example comprise or can be coupled to a display showing e.g. a notification message about the validation result. The notification module can be coupled to a positioning system. The notification module can for example provide feedback to the device and/or a positioning system about the status of the sensor placement.

According to an embodiment of the device, the simulation module can be configured to simulate a fault by means of the physical simulation model, and the optimization module can be configured to determine a second optimized position of the virtual sensor, where the response signal to the fault of the virtual sensor is intensified, by means of the optimization algorithm, and the output module can be configured to provide coordinates of the second optimized position and/or a response signal to the fault of the virtual sensor at the second optimized position.

According to an embodiment the device can comprise an error control module configured to perform an error control of the technical system, wherein
- a response signal of a physical sensor placed at the second optimized position is recorded,
- the response signal of the physical sensor is compared to the response signal to the fault of the virtual sensor, and
- an error control of the technical system is performed depending on the comparison of the response signals.

According to an embodiment of the device, the simulation module can provide a simulation of the technical system comprising a plurality of sensors, which can monitor the technical system and output according response signals, and the optimization module can be configured to determine optimized positions for the plurality of virtual sensors, where the response signals of the virtual sensors are intensified by means of the optimization algorithm.

Another aspect of embodiments of the invention relates to a positioning system, assigned to a device according to embodiments of the invention, configured to place a physical sensor at a first optimized position or at a second optimized position, wherein coordinates of the first optimized position or of the second optimized position are provided by the device.

The positioning system is configured to position or place a physical sensor at the technical system or at a position allocated to the technical system, such that the sensor can monitor a status of the technical system. The positioning system can be coupled to a device according to embodiments of the invention and/or both can be jointly integrated into one system.

According to an embodiment the positioning system can comprise a control module configured to control an actuator to place the physical sensor at the first or second optimized position.

The coordinates of the first or second optimized position can for example be transferred to a control module and converted to a control command to control an actuator.

According to an embodiment the positioning system can comprise a guiding module configured to provide directions for positioning the physical sensor at the first or second optimized position.

A guiding module can for example comprise a display showing e.g. an interactive map of the technical system or it can be assigned to an augmented reality setup supporting the placement of the sensor.

At least part of the device and/or the positioning system can be implemented as a software and/or hardware module.

Further, embodiments of the invention relates to a computer program product (non-transitory computer readable storage medium having instructions, which when executed by a processor, perform actions) directly loadable into the internal memory of a digital computer, comprising software code portions for performing the steps of one of a method according to embodiments of the invention when said product is run on a computer.

BRIEF DESCRIPTION

Some of the embodiments will be described in detail, with reference to the following figures, wherein like designations denote like members, wherein.

Equivalent parts in the different figures are labeled with the same reference signs.

DETAILED DESCRIPTION

Figure 1:
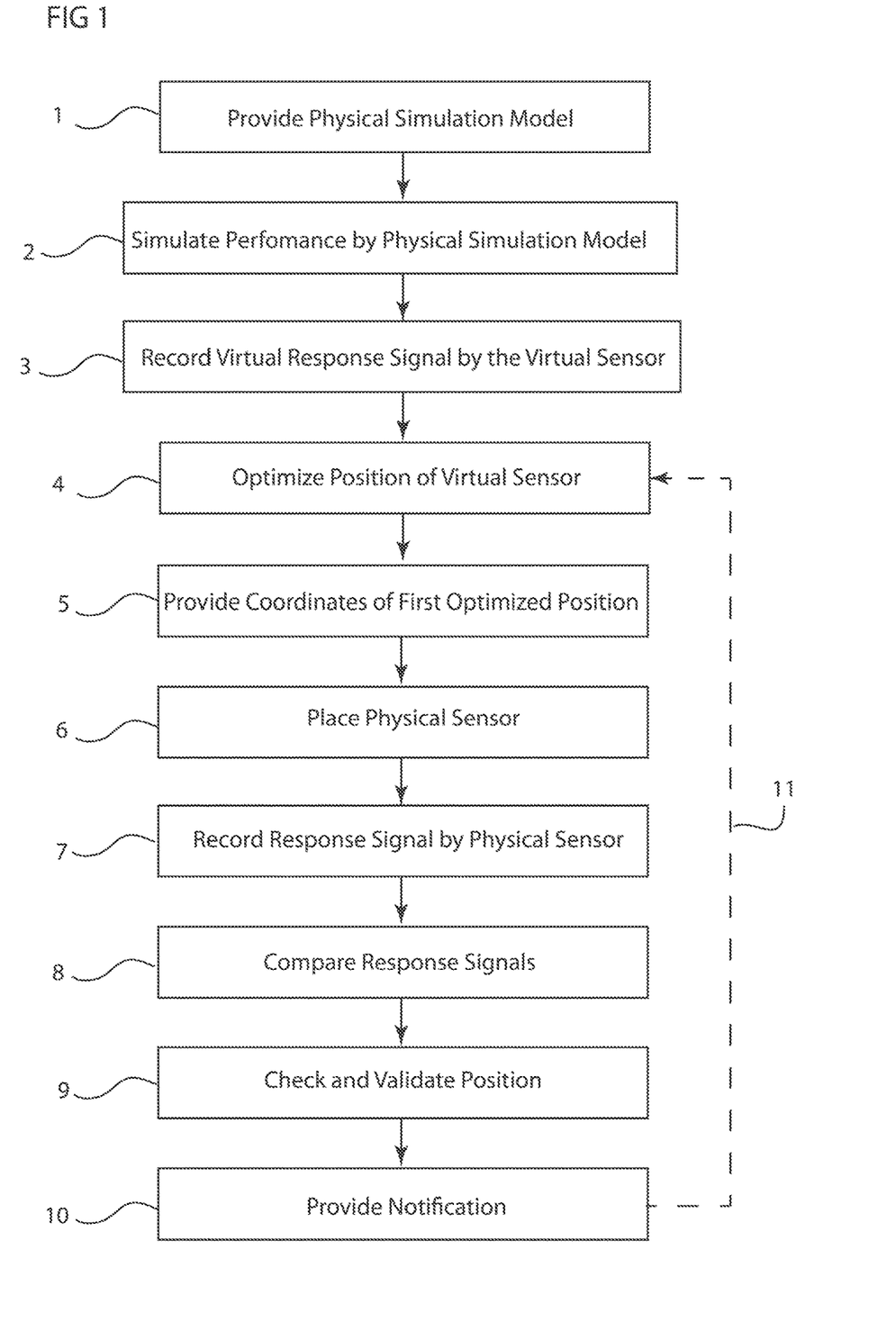
FIG. 1 shows a flow chart of a method according to embodiments of the invention.

FIG. 1 shows steps of a method according to embodiments of the invention for positioning a physical sensor at an optimized position in order to provide optimized sensor data when monitoring a performance of a technical system.

Step 1 comprises providing a physical simulation model of the technical system. The technical system can for example be an industrial or power plant, a motor or an engine or something similar. The physical simulation model can for example be defined and constructed in advance and can be retrieved from a storage unit or a database. It comprises physical properties of the technical system and at least of one virtual sensor which is suited to monitor a performance of the technical system. A virtual sensor can for example be a thermal or vibration sensor or a camera. The sensor type of the simulated sensor is chosen based on a physical sensor which is to be placed at the technical system. The physical simulation model can comprise a design model, such as a computer-aided design model, and a mathematical or numerical or data model, e.g. such as a finite-element-analysis model, of the technical system.

The performance of the technical system is simulated by means of the physical simulation model, see step 2. As part of the simulation process a virtual response signal to the performance of the simulated technical system is recorded by the virtual sensor at a given position at the technical system or close to the technical system, see step 3. In other words, by means of the physical simulation a fingerprint or characteristic or specific signal to a performance of the technical system is obtained depending on the sensor type. For example, a vibration sensor records specific vibration characteristics of the technical system. The response signal's characteristics and intensity depends on the position of the virtual sensor with respect to the technical system and its geometry and physical properties.

The position of the virtual sensor can be chosen for example based on information about physical properties or behavior of the technical system obtained from the physical simulation. For example, the physical simulation can provide information about parts of the technical system showing high vibration amplitudes or high thermal variations. Vibration or temperature sensors placed closely to these parts can for example yield an intensified signal compared to sensors placed at different locations. Such information from the physical simulation can be used as input for the optimization algorithm to optimize a sensor position.

In step 4 the position of the virtual sensor is optimized by means of a suited optimization algorithm. An optimized first position for a sensor is determined by for example comparing its response signal at different positions. The first optimized position is determined the response signal is enhanced considering the physical properties and geometry of the technical system and/or the sensor.

The coordinates of the determined first optimized position are provided in step 5 for positioning a physical sensor of a similar or the same sensor type as the simulated virtual sensor at the first optimized position at the technical system.

The physical sensor can be placed at the technical system, see step 6, e.g. on a particular part of the technical system or in its vicinity, to allow health or status monitoring. A response signal to a performance of the technical system is recorded by the physical sensor, see step 7. By comparing the response signal of the physical sensor with the recorded response signal of the virtual sensor, see step 8, the position of the physical sensor can be checked and validated, see step 9. In other words, the recorded response signal of the physical sensor is compared with a characteristic signal previously obtained by the simulation of the technical system. By matching the real with the virtual response signal, an optimized position of the physical sensor can be determined.

In step 10, a notification, e.g. a displayed message, a log entry or a warning signal, is provided depending on the result of the validation. The notification can for example comprise information about the status and/or the correctness of the placement, and/or the quality of the sensor data acquired by the physical sensor at a position.

The sensor data can in particular be used to update the physical simulation model of the technical system. Hence, step 11, can for example comprise a feedback loop feeding back sensor data as input data to refine or improve the physical simulation model. Therefore, by updating the physical simulation model of the technical system, the steps 4 to 10 can for example be repeated in order to find an even more precise optimized position for a sensor.

Figure 2:
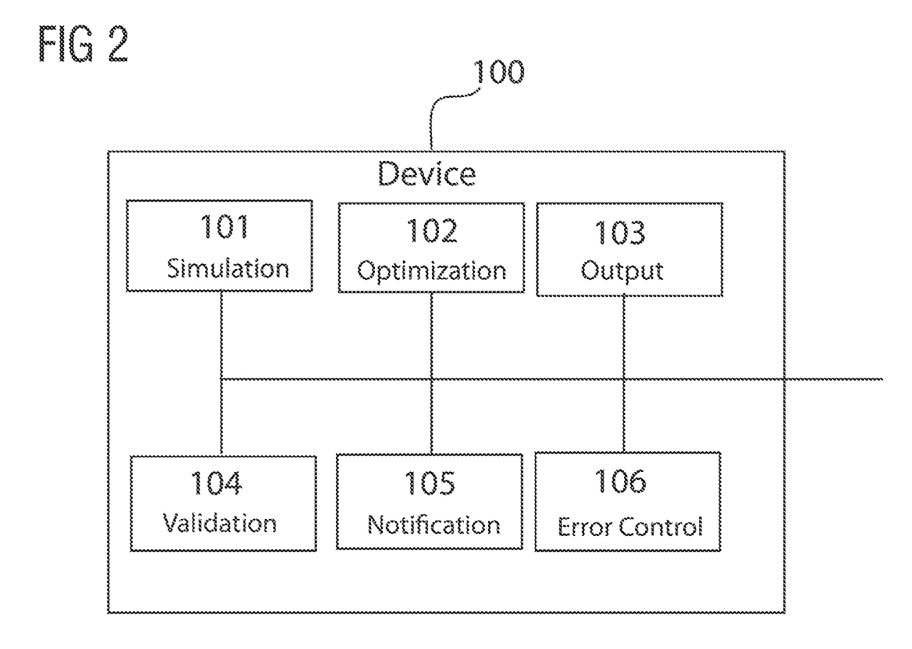
FIG. 2 shows a schematic diagram of a device according to embodiments of the invention.

FIG. 2 shows a device 100, e.g. an assistance system, for positioning a sensor at an optimized position according to embodiments of the invention. The device comprises a simulation module 101, an optimization module 102 and an output module 103. The device 100 can further comprise a validation module 104 and/or a notification module 105 and/or an error control module 106. The device 100 is suited to perform steps of a method according to embodiments of the invention. The device 100 can further comprise at least one processor or computer to perform at least one of the method steps according to embodiments of the invention. The modules are coupled with each other. The device can also be implemented as a software component and run on a computer.

The simulation module 101 is configured to provide a physical simulation model of the technical system and to perform a simulation thereof by means of the physical simulation model. The simulation module 101 can for example be coupled to a storage medium storing at least one physical simulation model. Furthermore, the simulation module 101 is configured to provide data of a response signal of a virtual sensor to a performance of the simulated technical system.

The optimization module 102 is configured to determine a first optimized position for the virtual sensor, wherein a first optimized position is found based on the intensity or strength or quality of the response signal to a performance of the technical system and by means of a suited optimization algorithm.

The output module 103 provides output data comprising coordinates of the optimized position and/or the response signal of the virtual sensor at the optimized position. The output data can be transferred to a positioning system according to embodiments of the invention and as exemplary shown in FIG. 3, configured to place a physical sensor at the first optimized position.

The validation module 104 is configured to validate a first optimized position of a physical sensor, which was for example placed by the positioning system. The validation can be based on the comparison of the real response signal of the physical sensor and the response signal of the virtual sensor which was obtained from the simulation. Therefore the validation module 104 can be coupled to the output of a physical sensor in order to receive a response signal and analyze it.

The notification module 105 is configured to provide a notification about the validation. The notification module 105 can be coupled to the validation module 104 and/or at least one physical sensor. The notification module 105 can for example be a display showing a notification message.

The device 100 can for example be an assistance system to provide information to a user. The notification module 105 can comprise a graphical user interface and can thereby provide information about the sensor placement to a user, while e.g. the simulation is run in a cloud. For example, if a user places the physical sensor at an unfavorable position, the received response signal cannot match the expected response signal from the simulation. By moving the physical sensor to different positions, the graphical user interface can e.g. display the different received signals and hence provide information about favorable or unfavorable placement of the sensor.

In another embodiment, the notification module 105 can display a digital model of the technical system, e.g. based on the simulation, together with a marked first optimized position of the virtual sensor which can be matched with the actual position of the physical sensor. For example sensor graphics are displayed interactively at their corresponding positions on a computer-aided design model. The raw coordinate output can also be shown.

In another embodiment, the simulation module 101 can further be configured to simulate a fault or an error or a failure of the technical system, which is introduced into the physical simulation model. In particular, the simulation can result in a response signal of a virtual sensor to the erroneous performance due to the fault. The optimization module 102 can in particular be configured to determine an optimized second position for the virtual sensor where its response signal to the introduced fault is intensified by means of a suited optimization algorithm. As a result, the simulation can yield an expected response signal or characteristic signal for a specific fault.

The coordinates of the second optimized position can be provided by the output module 103 and used to position a physical sensor at the according position at the physical technical system. The response signal of the physical sensor at the second optimized position can be recorded and compared with the response signal of the virtual sensor to the introduced fault. The error control module 106 is configured to perform an error control of the technical system by for example checking if the response signals match. In particular, the characteristics of a signal of the physical sensor at the second optimized position, as for example a specific vibration spectrum, can be used to detect or forecast a specific fault.

Figure 3:
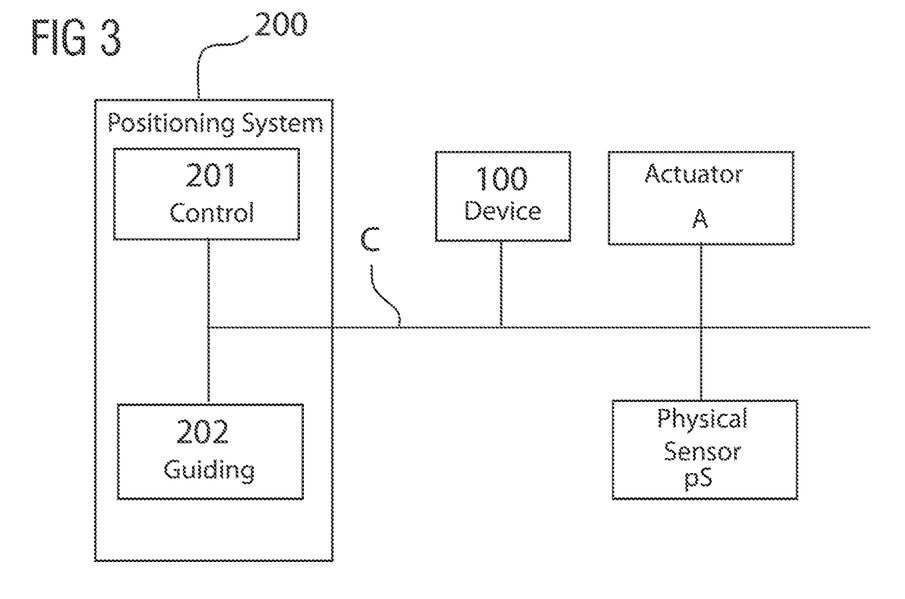
FIG. 3 shows a schematic diagram of a positioning system according to embodiments of the invention.

FIG. 3 shows a positioning system 200 according to embodiments of the invention, configured to position a physical sensor at a first or second optimized position, wherein the coordinates of the optimized position are provided by a device 100 according to embodiments of the invention and as e.g. shown in FIG. 2. The positioning system 200 can be assigned to or coupled with the assistance module 100, and/or to an actuator A and/or a physical sensor pS, e.g. via a communication interface or connection C. It is also possible that the assistance module 100 and the positioning system 200, or at least parts of their modules, are implemented in one system or machine or a cloud server. It is favorable that the positioning system 200 and/or device 100 are coupled with the technical system and/or at least with one of the physical sensors pS. The device 100 and the positioning system 200 according to embodiments of the invention can be configured to perform method steps according to embodiments of the invention.

The positioning system 200 can comprise a control module 201. The control module 201 is configured to control an actuator A to place the physical sensor pS at a first or second optimized position. The output module 103 of the device 100 can provide the coordinates of an optimized position and transfer this information to the control module 201. The control module 201 can for example control a robot arm which can mount a physical sensor pS at the determined optimized position, e.g. an embedded sensor which can be mounted within an automated assembly procedure.

The positioning system 200 can further comprise a guiding module 202 which is configured to provide directions for positioning the physical sensor pS at the first or second optimized position. The guiding module 202 can be coupled with a display and/or the notification module 105. For example the guiding module 202 can provide directions with respect to the position coordinates which are displayed by the notification module 105.

A feedback loop can be implemented to improve the sensor placement. For example the guiding module 202 provides directions to position a physical sensor pS at a certain position. The physical sensor pS provides a response signal to the performance of the technical system TS, wherein the response signal can be compared to an expected signal by the validation module 104. The result of the validation is provided by the notification module 105. If the placement of the physical sensor pS is not yet optimal, the notification module 105 can provide feedback to the positioning system 200 to refine the positioning.

It is further possible that the technical system TS comprises transducers establishing a navigation system which can be used to determine a location of a sensors relative to the transducers. The information about the location of the sensors can be provided to the positioning system 200.

The guiding module 202 can further provide directions for the control module 201 or for further tools in order to place a physical sensor at a given position. For example, the guiding module 202 can be coupled to an augmented reality interface, e.g. augmented reality glasses, which can be used to place the physical sensor at the correct position. The correct position for the sensor can hence be determined by tracking the sensor via an identity feature or sticker attached to it or via object-tracking and measuring the current distance between the sensor and a datum feature on the technical system.

Similarly, in another embodiment, the placement of the sensor by the positioning system 200 can be supported by an external camera or 3D-scanner to capture an image or video of the technical system and the physical sensor mounted to it. The captured image or movie can be compared to the physical simulation and/or at least to the design model by e.g. the validation module 104.

Figure 4:
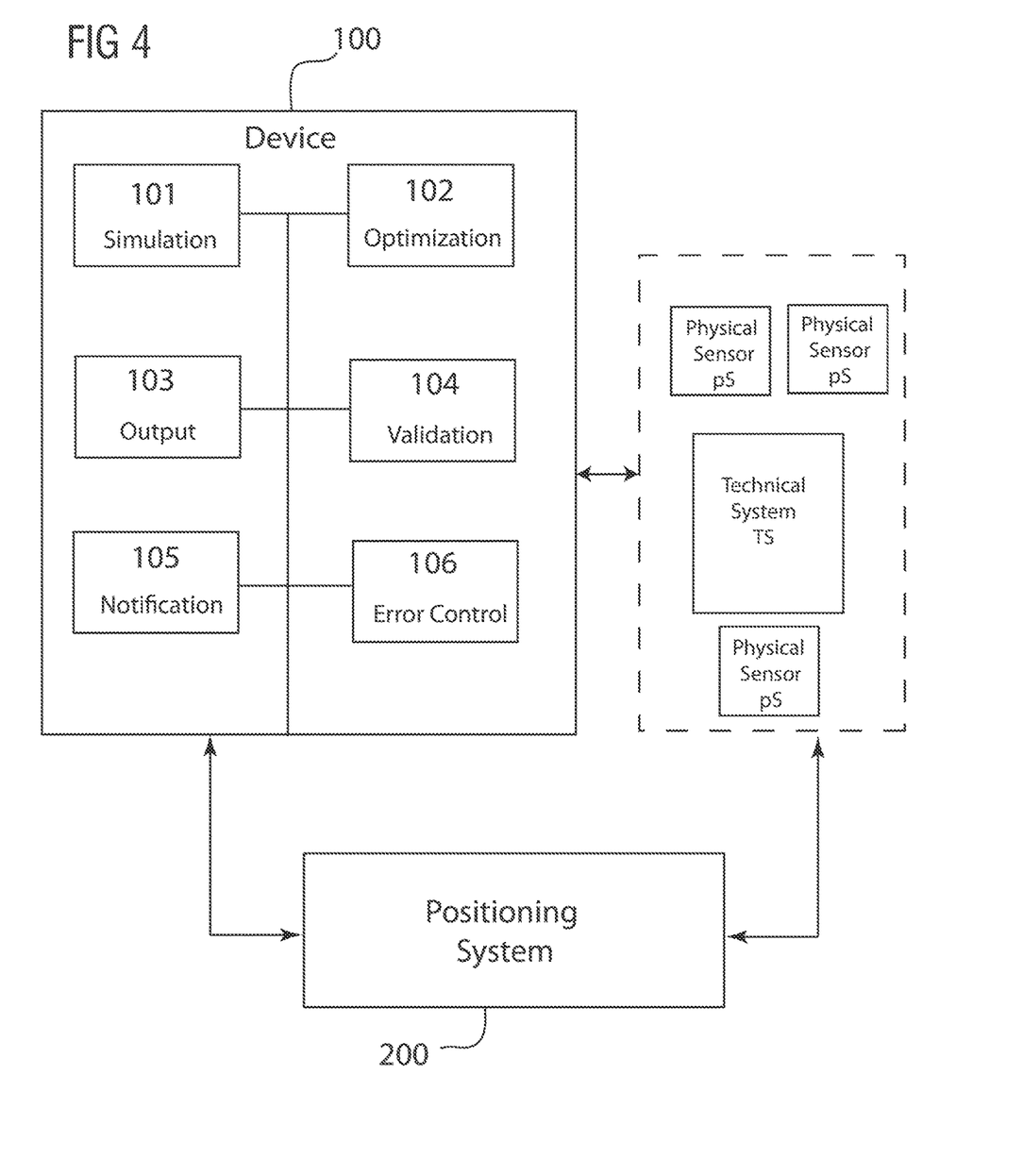
FIG. 4 shows a schematic diagram of a method according to embodiments of the invention.

FIG. 4 schematically shows a method according to embodiments of the invention for positioning a sensor for optimized monitoring of a technical system TS. A device 100 and a positioning system 200 are shown, which are coupled with each other. Furthermore a technical system TS with assigned physical sensors pS are shown. The physical sensors pS can be of the same or at least of two different types. By means of the modules 101 to 106 of the device 100 optimized positions are determined for the physical sensors pS to provide improved monitoring of the technical system TS. The sensors are placed at the optimized positions by means of the positioning system 200. The received signals of the physical sensors pS can be fed back to the validation module 104 to validate the placement of the sensors. Therefore the device 100, the positioning system 200, and the physical sensors pS are coupled with each other in order to provide feedback information about sensor positions and e.g. to iteratively improve the positioning of the sensors.

The simulation module 101 provides a physical simulation model of the technical system TS comprising a plurality of virtual sensors. The optimization module 102 is configured to provide optimized first positions for the sensors, in particular taking different types of sensors and/or physical and geometrical properties of the system into account. There can be for example two different types of sensors: temperature sensors and vibration sensors. The optimization of their respective positions is based on their response signals to a performance of the technical system TS, as e.g. the temperature variation or the vibration strength during operation. The response signals at the first optimized positions are enhanced and/or show a specific characteristic, e.g. a vibration spectrum or a temperature curve. The coordinates of the determined first optimized positions are transferred to the positioning system 200 which is configured to place the physical sensors pS at their respective first optimized positions. The response signals of the physical sensors pS at the first optimized positions are intensified and enable accurate health and/or status monitoring of the technical system TS. By means of the validation module 104 the positions of the physical sensors pS can be validated by comparing the recorded real response signals with the expected response signals from the simulation. For example, a vibration sensor can record a specific vibration spectrum which shows high amplitudes at specific frequencies. This spectrum can be compared with the expected spectrum which was retrieved from the physical simulation of the technical system TS.

Furthermore the device 100 can be configured to simulate a specific fault of the technical system TS and to provide second optimized positions for positioning the physical sensors pS, wherein at the second optimized positions the sensor response signals are expected to be enhanced if the fault occurs. Hence, placing the physical sensors pS at the respective second optimized positions can improve error control.

All methods and method steps can be implemented by corresponding means which are adapted for performing the respective method steps. All functions provided by particular means can be a method step of the method.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A method for positioning a sensor comprising the following steps:
providing a physical simulation model of a technical system, the physical simulation model comprising a virtual sensor at a given position,
simulating a performance of the technical system by the physical simulation model,
providing a first response signal of the virtual sensor to the simulated performance at the given position,
determining a first optimized position for the virtual sensor where the first response signal of the virtual sensor to the simulated performance is intensified by an optimization algorithm, wherein the first optimized position for the virtual sensor is different than the given position,
providing coordinates of the first optimized position for positioning a physical sensor at the technical system,
simulating an introduced fault of the technical system by the physical simulation model,
providing a second response signal to the introduced fault by the virtual sensor,
determining a second optimized position of the virtual sensor, where the second response signal to the introduced fault is intensified, by the optimization algorithm, wherein the second optimized position of the virtual sensor is different than the first optimized position for the virtual sensor,
providing the coordinates of the second optimized position and/or the second response signal to the fault at the second optimized position,
transferring the coordinates of the second position or the second optimized position to a control module of a positioning system; and
placing the physical sensor at the first optimized position or the second optimized position by the control module of the positioning system controlling an actuator to place the physical sensor, wherein a feedback loop is implemented as a function of the placing to refine a positioning of the physical sensor based on the feedback loop.

2. The method according to claim 1, wherein the response signal of the virtual sensor is compared to information about a behavior of the technical system acquired from the simulation and depending on the comparison the first optimized position is determined.

3. The method according to claim 1, wherein
the physical sensor is placed at a position depending on the coordinates of the first optimized position,
a response signal of the physical sensor is recorded,
the response signals of the virtual sensor and the physical sensor are compared, and
the position, at which the physical sensor is placed, is validated based on the comparison of the response signals.

4. The method according to claim 1, wherein a notification about a result of the validation is provided.

5. The method according to claim 1, wherein the physical simulation model is updated based on sensor data of the physical sensor.

6. The method according to claim 1, wherein
a response signal of a physical sensor placed at the second optimized position is recorded, the response signal of the physical sensor is compared to the response signal to the fault of the virtual sensor,
and
an error control of the technical system is performed depending on the comparison of the response signals.

7. The method according to claim 1, wherein the physical simulation model comprises a plurality of virtual sensors of at least two different sensor types and optimized positions thereof are determined where the response signals of the virtual sensors are intensified by the optimization algorithm.

8. The method according to claim 1, wherein the physical simulation model comprises a design model and a mathematical or numerical or data model of the technical system.

9. A system for positioning a sensor, comprising:
one or more processors configured to:
provide a physical simulation model of a technical system, the physical simulation model comprising a virtual sensor at a given position, simulate a performance of the technical system,
provide a response signal of the virtual sensor to the simulated performance at the given position,
determine a first optimized position for the virtual sensor where the response signal to the simulated performance is intensified by an optimization algorithm, wherein the first optimized position for the virtual sensor is different than the given position,
provide coordinates of the first optimized position for positioning a physical sensor at the technical system,
simulate an introduced fault by the physical simulation model,
determine a second optimized position of the virtual sensor, where the response signal to the introduced fault is intensified, by the optimization algorithm, wherein the second optimized position of the virtual sensor is different than the first optimized position for the virtual sensor, and
provide coordinates of the second optimized position and/or a response signal to the fault at the second optimized position;
transfer the coordinates of the second position or the second optimized position to a control module of a positioning system; and
control an actuator to place the physical sensor at the first optimized position or the second optimized position, wherein a feedback loop is implemented as a function of the placing to refine a positioning of the physical sensor based on the feedback loop.

10. The system according to claim 9, wherein the one or more processors are configured to validate a position of a physical sensor, wherein a response signal of the physical sensor is recorded, the response signals of the virtual sensor and the physical sensor are compared, and the position of the physical sensor is validated based on the comparison of the response signals.

11. The system according to claim 9, wherein the one or more processors are configured to provide a notification about a result of the validation.

12. The system according to claim 9, wherein the one or more processors are configured to perform an error control of the technical system, wherein
a response signal of a physical sensor placed at the second optimized position is recorded, the response signal of the physical sensor is compared to the response signal to the fault of the virtual sensor,
and
an error control of the technical system is performed depending on the comparison of the response signals.

13. The system according to claim 9, wherein the one or more processors are configured to simulate a plurality of sensors, of at least of two different sensor types, and to determine optimized positions for the plurality of virtual sensors, where the response signals of the virtual sensors are intensified by the optimization algorithm.

14. The system according to claim 9, wherein the one or more processors are configured to provide directions for positioning the physical sensor at the first or second optimized position.

15. A computer program product, comprising a non-transitory computer readable hardware storage device having computer readable program code stored therein, said program code executable by a processor of a computer system to implement the method of claim 1.

16. The method according to claim 5, further comprising:
providing an updated physical simulation model of the technical system,
simulating an updated performance of the technical system by the updated physical simulation model,
providing an updated response signal of the virtual sensor to the updated simulated performance,
determining an updated first optimized position for the virtual sensor where the response signal is intensified by the optimization algorithm, and
providing coordinates of the updated first optimized position for positioning the physical sensor at the technical system.

17. The method according to claim 1, wherein the method is repeated to iteratively improve the positioning of the physical sensor.

18. The method according to claim 1, comprising: placing a first physical sensor at the first optimized position and a second physical sensor at the second optimized position by the positioning system.

19. The method according to claim 1, wherein the feedback loop comprises a response signal of the physical sensor as to a performance of the technical system that is compared to an expected signal, and if a placement of the physical sensor is not yet optimal, feedback from the feedback loop is provided to the control module of the positioning system to refine the positioning.

20. The system according to claim 9, wherein the feedback loop comprises a response signal of the physical sensor as to a performance of the technical system that is compared to an expected signal, and if a placement of the physical sensor is not yet optimal, feedback from the feedback loop is provided to the control module of the positioning system to refine the positioning.

* * * * *